(12) United States Patent
Stephens et al.

(10) Patent No.: US 9,097,534 B2
(45) Date of Patent: Aug. 4, 2015

(54) DYNAMIC POSITIONING ARCHITECTURE

(75) Inventors: Richard Ian Stephens, Warwickshire (GB); Andrew Graham Chamberlain, Coventry (GB); Francois Cretollier, Marly le Roi (FR)

(73) Assignee: GE Energy Power Conversion Technology, Warwickshire (GB)

(*) Notice: Subject to any disclaimer, the term of this patent is extended or adjusted under 35 U.S.C. 154(b) by 754 days.

(21) Appl. No.: 12/551,642

(22) Filed: Sep. 1, 2009

(65) Prior Publication Data

US 2010/0088030 A1  Apr. 8, 2010

(30) Foreign Application Priority Data

Sep. 5, 2008 (EP) .................................... 08015676

(51) Int. Cl.
*G01C 21/00* (2006.01)
*G01C 21/16* (2006.01)
*B63H 25/04* (2006.01)
*B63H 25/42* (2006.01)
*G05D 1/02* (2006.01)

(52) U.S. Cl.
CPC ............... *G01C 21/16* (2013.01); *B63H 25/04* (2013.01); *B63H 25/42* (2013.01); *G05D 1/0206* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,335,433 A | * | 6/1982 | Bauer et al. | 701/472 |
| 5,362,263 A | * | 11/1994 | Petty | 440/1 |
| 5,375,059 A | * | 12/1994 | Kyrtsos et al. | 701/470 |
| 5,640,325 A | * | 6/1997 | Banbrook et al. | 701/505 |
| 6,459,990 B1 | * | 10/2002 | McCall et al. | 701/501 |
| 6,477,465 B1 | * | 11/2002 | McCall et al. | 701/501 |
| 6,622,091 B2 | * | 9/2003 | Perlmutter et al. | 701/472 |
| 7,058,505 B1 | * | 6/2006 | Milelli et al. | 701/536 |
| 7,496,434 B2 | * | 2/2009 | Fossen et al. | 701/21 |

(Continued)

FOREIGN PATENT DOCUMENTS

| | | |
|---|---|---|
| CN | 1619440 A | 5/2005 |
| CN | 1693851 A | 11/2005 |

(Continued)

OTHER PUBLICATIONS

Paturel Yves, "PHINS, An All-In-One Sensor for DP Applications", Dynamic Positioning Conference, Sep. 29, 2004, pp. 1-10, XP002514167, Houston.

(Continued)

*Primary Examiner* — Jonathan L Sample
(74) *Attorney, Agent, or Firm* — Parks Wood LLC

(57) ABSTRACT

The present invention provides an improved architecture for integrating an inertial navigation system (INS) into a dynamic positioning (DP) system for a vessel. The architecture includes an INS unit and a DP system having a Kalman filter or other algorithm for combining data supplied by a plurality of position measuring equipment (PME) and the INS unit to derive an estimate of the position or speed of the vessel. A switch array and a switch array controller are also provided. These may optionally form a part of the DP system. The switch array is operable under the control of the switch array controller to supply data supplied by one or more of the plurality of position measuring equipment to the INS unit for the purposes of correcting drift. The selection of which of the one or more PME is/are to be combined with the INS unit is made automatically, in real time, to dynamically optimise the DP system.

9 Claims, 13 Drawing Sheets

(56) References Cited

U.S. PATENT DOCUMENTS

| | | | |
|---|---|---|---|
| 7,579,984 B2 * | 8/2009 | Wang et al. | 342/357.59 |
| 7,663,976 B2 * | 2/2010 | Stephens | 367/128 |
| 7,711,476 B2 * | 5/2010 | Chiou et al. | 701/480 |
| 7,768,873 B2 * | 8/2010 | Scoca et al. | 367/89 |
| 2002/0008661 A1 * | 1/2002 | McCall et al. | 342/357.14 |
| 2002/0169553 A1 * | 11/2002 | Perlmutter et al. | 701/214 |
| 2003/0149528 A1 * | 8/2003 | Lin | 701/214 |
| 2006/0058929 A1 * | 3/2006 | Fossen et al. | 701/21 |
| 2006/0106511 A1 * | 5/2006 | Milelli et al. | 701/33 |
| 2006/0293853 A1 * | 12/2006 | Chiou et al. | 701/223 |
| 2007/0118286 A1 * | 5/2007 | Wang et al. | 701/213 |
| 2009/0059723 A1 * | 3/2009 | Scoca et al. | 367/89 |
| 2009/0254279 A1 * | 10/2009 | Han et al. | 701/221 |

FOREIGN PATENT DOCUMENTS

| | | |
|---|---|---|
| CN | 1869630 A | 11/2006 |
| CN | 1914087 A | 2/2007 |
| JP | 2001264107 A | 9/2001 |
| WO | 0210794 A2 | 2/2002 |
| WO | 2008056972 A1 | 5/2008 |

OTHER PUBLICATIONS

Office Action from corresponding CN Application No. 200910172111.X, dated May 22, 2013.

* cited by examiner

DYNAMIC POSITIONING ARCHITECTURE

CROSS REFERENCE TO RELATED APPLICATION

This application claims priority to European Patent Application No. 0801567.3 filed Sep. 5, 2008.

FIELD OF THE INVENTION

The invention relates to an architecture for the dynamic positioning (DP) of marine vessels, i.e. the use of thrusters to maintain the position of a vessel in the vicinity of a reference point and stabilise its heading, in opposition to environmental forces such as wind and current. The architecture is particularly concerned with the way in which an inertial navigation system (INS) can be integrated with the DP system.

The term "vessels" is intended to include ships, drilling rigs and any other surface-going vessels or platforms or submersible (submarine) vessels. The invention is principally relevant to applications in deep water but the use herein of the word "marine" is not intended to exclude its application in freshwater lakes or other shallow water.

The term "inertial navigation system (INS)" is intended to include systems that contain an inertial measurement unit (IMU), which is normally a lower-level measurement system with an internal or external data fusion algorithm.

The term "dynamic positioning (DP) system" is intended to include other positioning systems for vessels such as position mooring systems and thruster-assisted mooring systems which combine aspects of a DP system with a mooring system.

BACKGROUND OF THE INVENTION

A vessel moves in six axes, three translational (surge, sway and heave) and three rotational (roll, pitch and yaw). These six axes are shown in FIG. 1. A DP system for a surface vessel usually controls only the three movements in the horizontal plane, namely surge, sway and yaw, but it may need to take into account measurements on all six axes.

The fundamental components of a DP system are: one or more position reference systems to measure the vessel position and heading; thrusters to apply control action; and a controller to determine the required thrusts. The object of a DP system is not to hold the vessel absolutely stationary, but to maintain its station within acceptable limits. The magnitude of the permitted position variation is dependent upon the application and on operational concerns. In many applications a loss of position beyond the acceptable limits may have a severe impact either on the safety of personnel or equipment, or on the environment. It is vital, therefore, that adequate measures are taken to maintain the integrity of the DP system as far as is reasonably possible.

Safe operation in DP relies upon measurement of the vessel position and heading at all times. In order to ensure that this is true, even under fault conditions, all measurement systems include redundancy. Physical redundancy requires the replication of equipment to ensure that a single failure of any piece of equipment will not result in complete failure of the overall system and allows faulty equipment to be by-passed using the redundant hardware. The parallel redundant systems must be independent—i.e. no single failure mode should be capable of disabling the overall system.

The DP system combines all available measurements of position, from whatever source, into a single estimate of vessel position. The algorithm for combining the measurements can be based on a Kalman filter.

The sources of measurements can include a wide variety of position measurement equipment (PME) such as gyrocompasses (which offer compact, reliable and accurate measurement of vessel heading (yaw), independent of outside disturbances), taut wires, satellite navigation systems (which include global positioning systems (GPS) and differential GPS (DGPS)), inertial navigation systems (INS), and hydro-acoustic positioning systems.

An INS uses measurements of acceleration to estimate the motion of a vessel in an inertial reference frame. However, due to physical processes associated with the acceleration due to gravity, plus inherent accuracy and noise within the devices themselves, a degree of drift on position measurements will always be present. This means that there is a need for periodic updates to the INS estimates of drift. These updates can be supplied by another PME unit such as a hydro-acoustic positioning system or a satellite navigation system, for example.

INS and Hydro-Acoustic Positioning Systems

The problems of deep-water acoustics are well known (Stephens, R. I. "Aspects of industrial dynamic positioning: reality-tolerant control", *IFAC Conference on Control Applications in Marine Systems, CAMS* 2004, 7-9 Jul. 2004, Ancona, Italy , pp. 41-51). The depth introduces long ping cycle times due to the distance for the sound to travel, unless so-called ping stacking is employed. Deep water also increases the cost of replacing batteries in transceivers, which starts to become a significant proportion of the overall cost of the hydro-acoustic positioning system. By increasing ping cycle times the battery life can be extended. Ping stacking only serves to reduce the battery life. Unfortunately, the increased ping times can adversely affect the DP control. This is true even though it is straightforward to configure the DP Kalman filter controller to make use of long measurement update rates. It tends to lead to higher thrust usage as the DP system detects deviations later and has to apply greater adjustments in thrust. Any changes in environmental forces or small inconsistencies in the vessel model of the DP system are exacerbated by a long ping time. There is also the possibility that aliasing effects due to long position measurement periods will introduce increased noise into the position measurements.

Integrating an INS into the hydro-acoustic positioning system can allow the long ping times to be reduced by using the INS to fill-in between pings.

In order to investigate the benefits of this approach, a number of tests have been conducted on a two small vessels utilizing a hydro-acoustic positioning system, combined with a PHINS inertial sensor (both items being supplied by IXSEA of 55, Avenue Auguste Renoir, 78160 Marly le Roi, France). The tests were performed in ultra-short baseline (USBL) mode in 15 m water depth off Brest (France) and in 1000 m water depth off La Ciotat (France). In the deeper water, the shortest ping cycle time, without ping stacking, was 3 s; therefore data was collected at that rate. Both raw acoustic data and PHINS corrected positions were logged. An additional signal was generated from the PHINS using acoustic measurements sampled every 21 s rather than 3 s.

While it was not possible to install a DP system on the vessel in the time-scale of the trials, the results have been post-processed using a simulation of the DP system to estimate the behaviour of a vessel controlled by a DP system under the same conditions. The measured errors from the INS trials have been imposed on the simulation and comparisons made between raw acoustic signals at 21 s updates and acoustics plus INS.

FIG. 2 shows a comparison of the vessel position errors during the simulation runs. It shows that the position keeping is significantly improved by using the INS corrections. The standard deviation of X-axis errors for acoustics only is 6.8 m while using INS reduces this to 3.4 m.

An even greater improvement is achieved in the thrust demands from the DP system for the same scenario. FIG. 3 compares the thrust demands with and without the INS corrections. It shows that thruster usage is dramatically reduced when the INS is filling-in between pings. This reduction in the thrust demand variation means less mechanical fatigue, less wear and reduced maintenance. Another consequence is a reduction of the thruster-generated noise in the water, which means better acoustic detection through an improved signal to noise ratio, not only providing more accurate and secure acoustic positioning, but also enabling operations in deeper waters.

A further illustration is gained by comparing the fuel consumption during DP. By estimating thruster power P from thrust T using the approximate relationship: $P \propto T^{1.5}$, the relative fuel consumption can be estimated. FIG. 4 shows the evolution of relative fuel consumption calculated in this way. It reveals that the INS can reduce fuel consumption by a factor of five or more.

INS and Satellite Navigation Systems

The use of INS with satellite navigation systems (both GPS and DGPS) provides the following benefits: detection of GPS failures, removal of erroneous 'jumps', ride-through for temporary outages, and reduced thrust demand implying lower fuel consumption in nominal operation.

A common occurrence using GPS and DGPS is a jump in the position estimate. This can occur when the visible satellite constellation changes, either as the result of satellites rising or setting, or due to shielding from nearby objects. Typical examples of the latter include passing under a bridge or approaching a platform. These jumps are often negligible, but sometimes become significant. For example, FIG. 5 shows a short jump of about 3 m and a short outage of about 15 s, which occurred in open water in the North Sea. The severity of a jump depends upon the operational situation of the vessel. Under most conditions a jump of 3 m is not problematic. During a close approach to a platform or other vessel, however, even small jumps can be 'uncomfortable'. The DP system includes algorithms for error detection, including detection of noise, jumps and drift. Though these algorithms are sophisticated in their own way, the most reliable forms of error detection rely on comparison of two, three or more PME. The INS, as it is not based on a model but on real acceleration measurements, not only acts as a filter on the DGPS measurements, but also rejects data during short term jumps, and fills-in for short outages.

Use of a high-quality INS in conjunction with a DGPS receiver reduces the level of high-frequency noise on the measured position. This has the effect of reducing the noise on the thruster demands, in the same way as the INS reduced the noise of the acoustics discussed above. In the case of the DGPS receiver, the effect is less dramatic since the noise is initially smaller. This reduction of noise is not the same as filtering: filtering introduces extra phase-lag into the control system whereas the INS is enhancing the position accuracy of the measurements without introducing lag.

Sea trials have been conducted on a 7000 t vessel utilizing a DP system supplied by Converteam UK Ltd of Boughton Road, Rugby, Warwickshire CV21 1BU, United Kingdom and a DGPS receiver combined with a PHINS inertial sensor. For part of the trial, the vessel was held in a constant position under full control of the DP system with the DGPS receiver as the only PME, followed by a period with the combination of the DGPS receiver and the PHINS inertial sensor as the only PME. FIG. 6 shows the thruster demands for the X and Y axes during the two periods of operation. There is noticeably less noise for the combination of the DGPS receiver and the INS.

In order to compare the expected fuel consumption with and without the INS corrections, the thrust demands were used to estimate a relative fuel consumption using the relationship $P \propto T^{1.5}$ as before. The results of the estimation, for the 10 min periods of the trial are shown in FIG. 7. The system without the INS uses 40% more fuel than the combination of the DGPS receiver and the INS.

The usefulness of an INS during an outage of other PME depends on its drift. This drift is a function of inertial measurement unit (IMU) quality, calibration and correction. The short term accuracy of an INS derives from the accuracy of its accelerometers, while the longer term accuracy derives from the gyro accuracy. The position is defined by the double integration of the accelerometers, so the position drifts according to the square of time and the stability of the accelerometers.

Previously, outage data has been obtained for a stationary INS unit (Paturel, Y. "PHINS, an all-in-one sensor for DP applications", *MTS Dynamic Positioning Conference*, 28-30 Sep. 2004, Houston, United States of America). However, it will be readily appreciated that on a sea-borne vessel the INS will never be stationary. A series of tests were therefore carried out using a GPS receiver and an INS in constant oscillatory motion, simulating bad weather. During the tests, the GPS input to the INS was removed at periodic intervals and the positions of the INS and GPS compared over a period of 'outage'. Typical results from these tests are shown in FIGS. 8 and 9. FIG. 8 shows the evolution of the INS drift with time during outages of 120 s and 300 s. The results compare well with previous investigations of stationary systems.

FIG. 9 shows the distribution of the errors after 120 s and after 300 s. The distribution of drift errors exhibit the shape of the Rayleigh distribution, which is characteristic of processes formed from the sum of squares of Gaussian distributed sources—because the drift distance is the sum of squares of the deviations in North and East directions.

To get an idea of the relative drifts of a vessel with no PME and one using only INS, it is possible to estimate the force required to move a vessel off-station by the same amount as the observed INS drift. Taking the worst case from FIG. 8, distance traveled s=22 m after time t=300 s, the equivalent constant acceleration a can be calculated from $a=2 s/t^2=4.9 \times 10^{-4}$ m/s$^2$. For a typical supply vessel of displacement $\nabla=4000$ t, the force F required to achieve this acceleration would have been $F=\nabla a=2.0$ kN. This is less than about 1% of the likely onboard thrust, suggesting that under moderate conditions, a vessel with no PME is likely to drift far more quickly than the INS. In addition, the drift of the INS is based on real physical measurements of the accelerations, not on a model which would become degraded in case of non-nominal conditions like bad weather with large waves, or breaking of cables or an umbilical that would be linked to the platform.

It should be noted that the intervals between the trials presented in FIG. 8—i.e. periods during which the GPS was available again—were between 30 s and 300 s with no obvious difference between the two. This suggests that the self-alignment of the PHINS inertial sensor is excellent, and the interval between outages is unlikely to be a problem in practical situations.

Known DP System Architecture

Due to its dependence on position measurements continually to estimate the errors in the accelerometers, it is not possible to treat an INS alone as an independent PME unit. It will always be dependent on one or more of the other PME units. So, to keep independence between the PME units, the general practice is that an INS unit should be tightly coupled with a single PME unit, for example a hydro-acoustic positioning system.

FIG. 10 shows an example of a typical architecture for a DP system. The DP system receives data from a plurality of PME units—in this case from two satellite navigation systems labelled GPS1 and GPS2, a hydro-acoustic positioning system labelled Acoustics1—and an INS unit. The data supplied by the PME units and the INS unit will normally represent position measurements, but it may also represent acceleration measurements or velocity measurements, for example. Additional information such as status indicators, data quality indicators and statistical information may also be included in the data that is supplied by the PME units and the INS unit.

The INS unit receives data from a second hydro-acoustic positioning system labelled Acoustics2 and the DP system treats the combination of the second hydro-acoustic positioning system and the INS unit as a single input (i.e. as a single PME unit). The data from the second hydro-acoustic positioning system is used to correct the drift in the INS unit.

In this configuration it is important for information to be passed to the DP system concerning the quality of the combination of the second hydro-acoustic positioning system and the INS unit. For example, the DP should be warned if the INS unit loses the data from the second hydro-acoustic positioning system.

It will be readily appreciated that one of the two satellite navigation systems GPS1 and GPS2 can also be combined with an INS in the same way. In other words, the INS unit could receive data from a GPS receiver to correct the drift in the INS unit.

An alternative architecture is shown in FIG. 11. In this architecture the DP system receives data from a plurality of PME units—in this case from two satellite navigation systems labelled GPS1 and GPS2, two hydro-acoustic positioning systems labelled Acoustics1 and Acoustics2—and an INS unit. The INS unit can receive data from all of the PME units. However, it is important that the INS unit uses the data supplied by only one of the PME units at any one time to maintain its independence from the others. The alternative architecture shown in FIG. 11 offers the main advantage of flexibility to the operator. The operator has the ability to choose between two possible configurations, depending on his application. For instance, if acoustics is required the operator can choose a configuration where the INS unit receives data from one of the hydro-acoustic positioning systems. Otherwise, the operator may choose a configuration where the INS unit receives data from one of the satellite navigation systems. The data from the PME unit will be used to correct the drift of the INS unit.

The status indicators sent to the DP system must include enough information for the DP system to determine the configuration of the PME units and the INS unit. In particular, the DP system must be able to ensure that the particular PME unit used in the INS calculations is not used by the Kalman filter to derive the vessel position estimates. For example, if the INS unit is configured to receive position measurements from the second hydro-acoustic positioning system (Acoustics2) then the DP system will not use any position measurements supplied directly from the second hydro-acoustic positioning system to derive the vessel position estimates. The DP system may, however, use any additional information that is supplied directly from the second hydro-acoustic positioning system. Any position measurements supplied by the INS unit will, of course, be used by the DP system to derive the vessel position estimates.

The alternative architecture of FIG. 11 is already feasible with existing equipment because the PHINS inertial sensor includes multiple input ports.

SUMMARY OF THE INVENTION

The present invention provides an improved architecture comprising:
  an inertial navigation system; and
  a dynamic positioning system for a vessel having means for combining data supplied by at least one of a plurality of position measuring equipment and data supplied by the inertial navigation system to derive an estimate of the position or speed of the vessel;
  a switch array; and
  a switch array controller;
  wherein the switch array is operable under the control of the switch array controller to supply data supplied by at least one of the plurality of position measuring equipment to the inertial navigation system for the purposes of correcting drift.

The integration of an inertial navigation system (INS) and a dynamic positioning (DP) system provides certain technical advantages as discussed above. The improved architecture allows the drift of the INS to be corrected by providing periodic updates from one or more of a plurality of positioning measuring equipment (PME). Unlike previous architectures, the selection of which PME to combine with the INS is carried out automatically by the switch array under the control of the switch array controller for optimisation of the overall DP system.

Any data that is not used by the INS for the purposes of correcting drift can be used by the DP system to derive the vessel position estimate.

The architecture is suitable for use with a wide range of PME including inter alia hydro-acoustic positioning systems providing long baseline (LBL) position data and/or ultra-short baseline (USBL) position data or ranges to known or estimates positions, satellite navigation systems providing GPS or differential GPS (DGPS) position data, laser-based systems, radio-based systems, radar-based systems, mechanical systems (taut-wire), or a log providing velocity data, like an electromagnetic log or a Doppler Velocity Log (DVL). DVLs operate by measuring the Doppler shift of high-frequency acoustic signals reflected either from the seabed (known as "bottom lock") to derive the vessel's speed relative to the sea bed; or from particles in the water below the keel (known as "water lock") to derive the vessel's speed relative to the surrounding water.

The data supplied by the plurality of PME and the INS will normally represent position measurements, but it may also represent acceleration measurements or velocity measurements, for example. In the case where the INS is an inertial measurement unit (IMU)—which is normally a lower-level measurement system that may be incorporated within an INS—then the data would normally represent acceleration measurements. In the case where the PME is a DVL then the data would normally represent velocity measurements. Additional information such as status indicators, data quality indicators and statistical information may also be included in the data that is supplied by the plurality of PME and the INS.

The data can be transmitted along communication lines, typically wires or cables, that extend between the architecture components.

The switch array controller can use data supplied by the plurality of PME (and optionally also the vessel position or speed estimate provided by the DP system and/or the INS) to automatically operate the switch array in order to select data supplied by one or more of the plurality of PME and supply it to the INS to correct drift. The switch array controller preferably employs selection logic to determine, in real time, which of the PME should be combined with the INS and which other PME should be used by the DP system. The selection logic uses data supplied by the plurality of PME (and optionally also the vessel position or speed estimate provided by the DP system and/or the INS) to make this determination, which may be driven by any suitable criteria depending on the operational requirements of the DP system. For example, the switch array controller may operate the switch array such that the PME supplying the best quality data is combined with the INS. Data from the selected PME is then supplied to the INS to correct for drift while data from the remaining PME, together with the data from the INS, is used by the DP system to derive an estimate of the position of the vessel. If different PME subsequently starts to supply the best quality data then the switch array controller will operate the switch array such that this PME is combined with the INS. The switch array controller therefore acts to dynamically optimise the operation of the DP system.

The operation of the switch array controller can be constrained so that the switch array only selects between PME of the same type or between PME providing the same data type (e.g. position data or velocity data), for example. If the switch array controller is unconstrained then the switch array will typically be able to select between any of the available PME.

It will normally be the case that only one PME will be combined with the INS such that data supplied by the remaining PME can be used by the DP system to derive the vessel position estimate. However, in practice there is no reason why two or more PME cannot be combined with the INS such that data supplied by those PME is used to correct for drift. In the situation where the INS receives data from two or more PME then the INS may be configured to choose which data it wants to use to correct for drift. Alternatively, the data from the two or more PME can be combined before being used by the INS (e.g. using a Kalman filter or other algorithm).

The switch array controller may also operate the switch array in accordance with an operator command. In other words, the operation of the switch array may be controlled directly by an operator to combine one or more PME with the INS. In this case the dynamic optimisation of the operation of the DP system is overridden by the operator command. The operator may be a human operator or an external control system, for example.

The switch array and switch array controller may be incorporated as part of the DP system or the INS. Alternatively, the switch array and switch array controller are provided as a stand-alone switch unit that is integrated with the DP system and the INS.

More than one INS may be provided. In this case, a switch array may be provided for each INS. Each switch array would be operable under the control of a switch array controller to supply data supplied by one or more of the plurality of position measuring equipment to its associated INS for the purposes of correcting drift. For example, in architecture with a first pair of PME (e.g. two hydro-acoustic positioning systems) and a second pair of PME (e.g. two satellite navigation systems) then a first switch array may be operated to supply data from one or both of the first pair of PME to a first INS and a second switch array may be operated to supply data from one or both of the second pair of PME to a second INS. Any data that is not used by the first or second INS to correct for drift can be used by the DP system to derive the vessel position estimate.

The switch arrays associated with the first and second INS can be controlled by a single integrated switch array controller. Alternatively, each switch array can have its own switch array controller.

The or each INS may be incorporated as part of the DP system.

The means for combining the data can be a Kalman filter or some other suitable algorithm.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
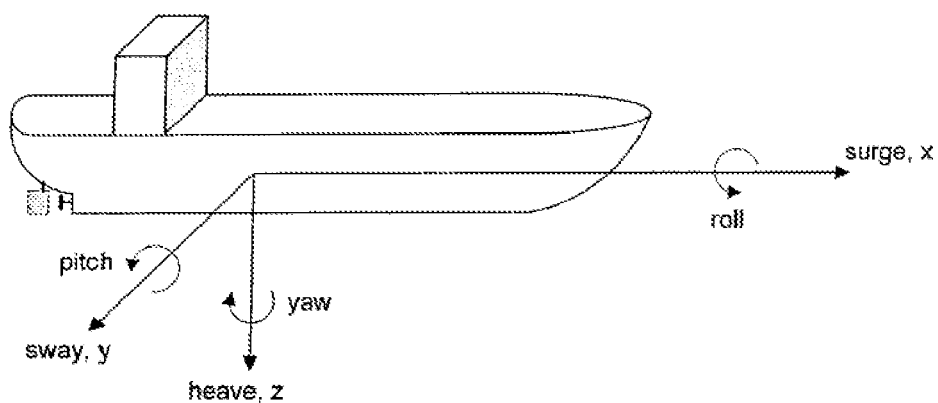
FIG. 1 is a diagram of the six axes of motion of a vessel.
Figure 2:
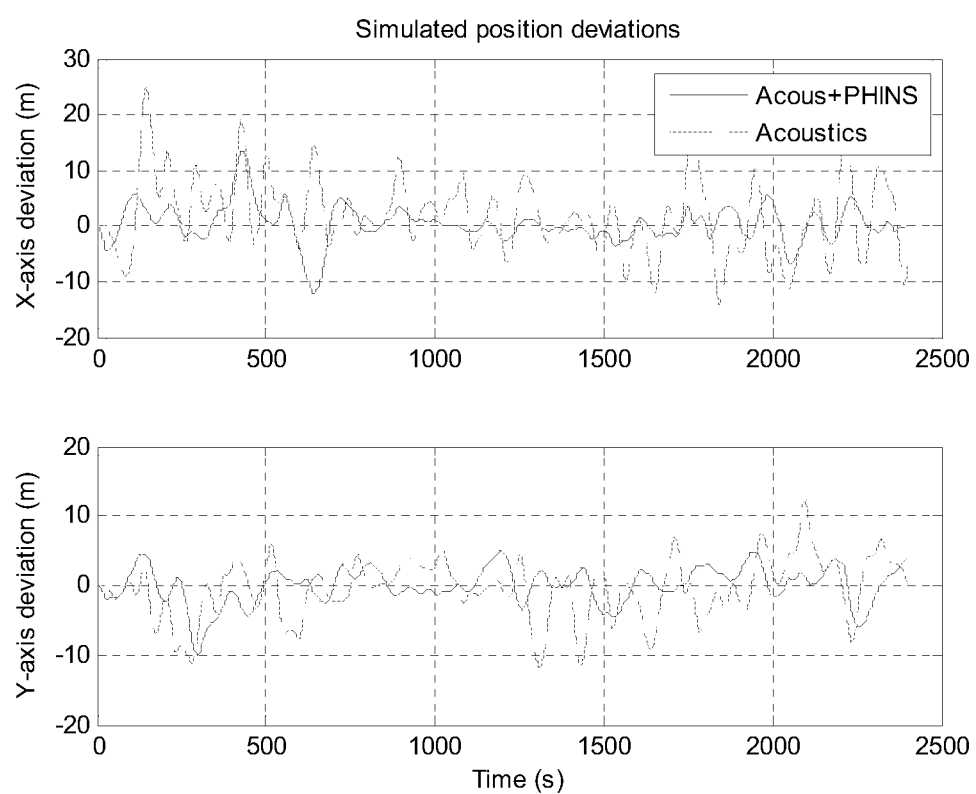
FIG. 2 is a graph showing simulated position deviations for acoustics with/without INS in-fill.
Figure 3:
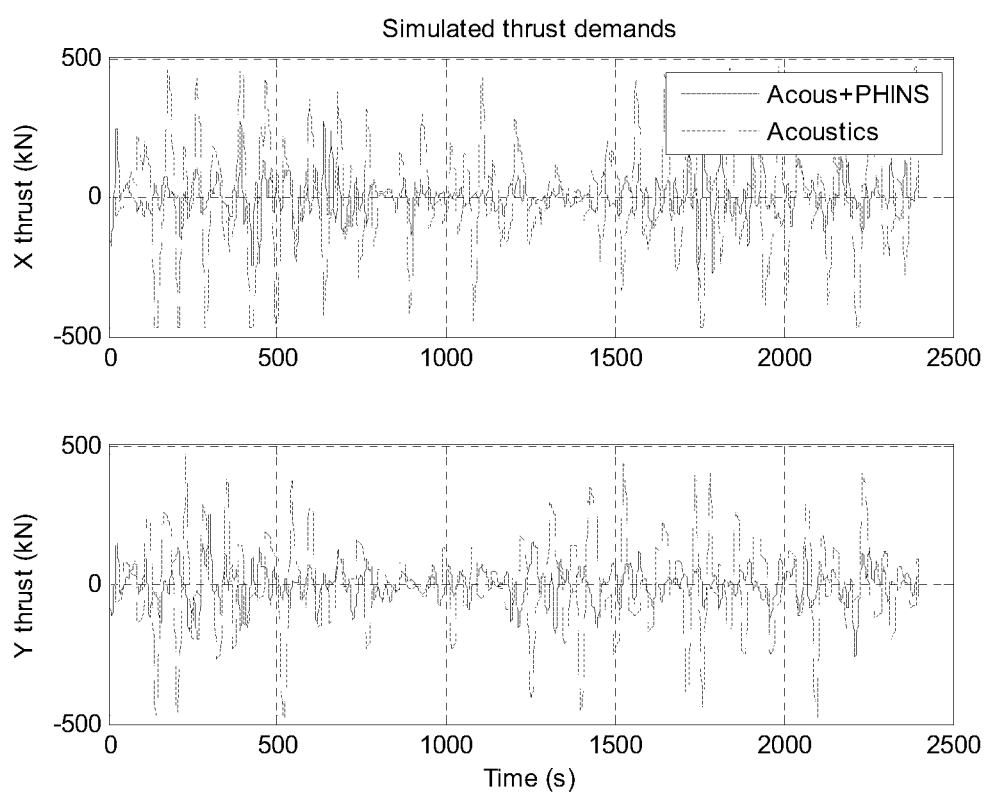
FIG. 3 is a graph showing thrust demands for acoustics with/without INS in-fill.
Figure 4:
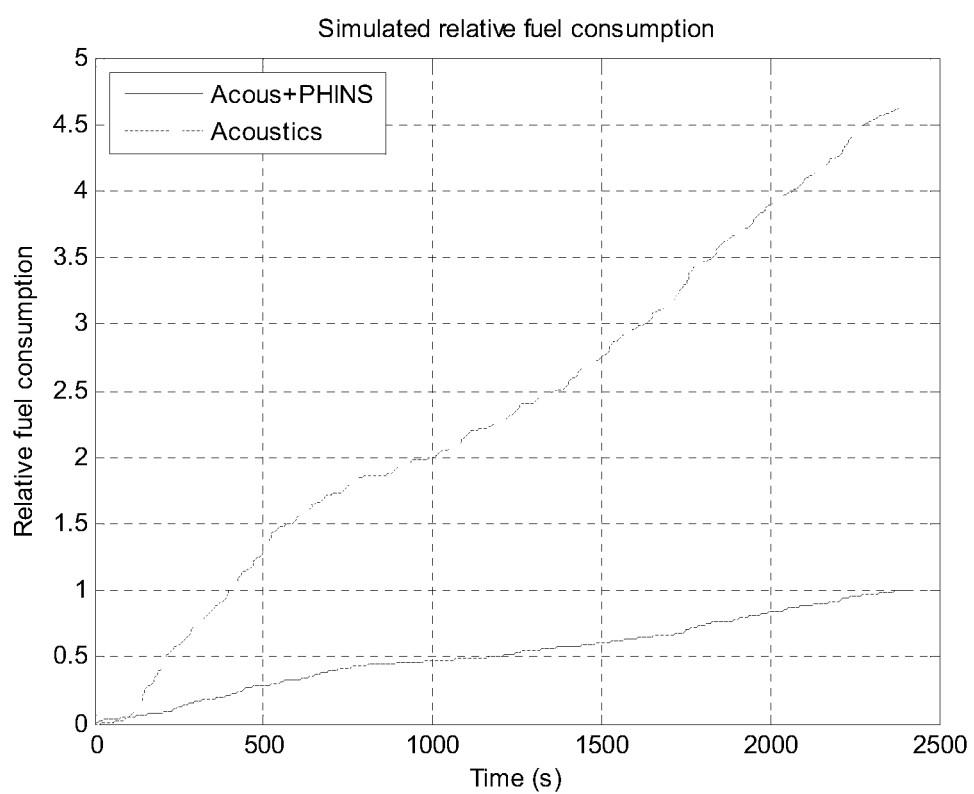
FIG. 4 is a graph showing estimated relative fuel consumption for acoustics with/without INS in fill.
Figure 5:
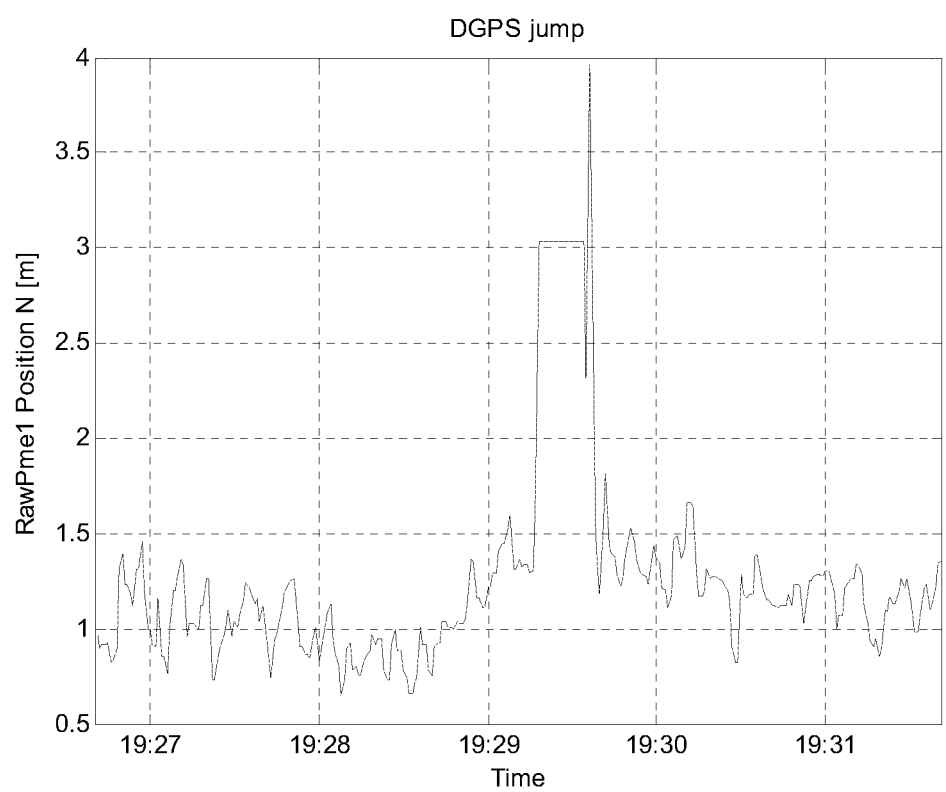
FIG. 5 is a graph showing DGPS jumps in open water.
Figure 6:
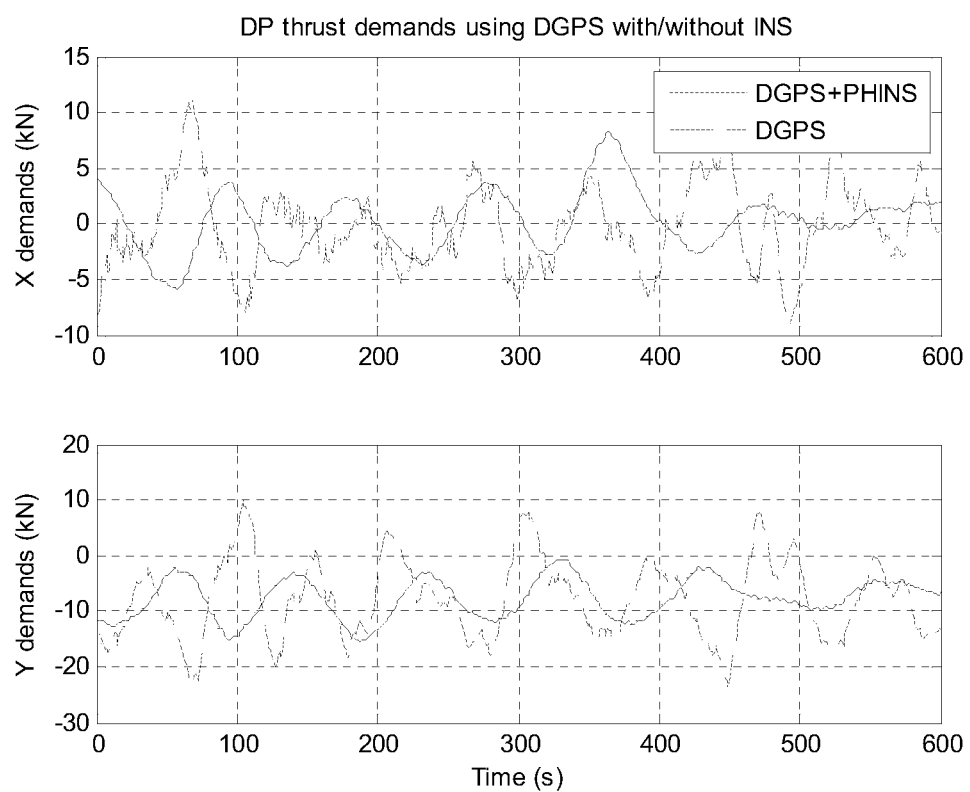
FIG. 6 is a graph showing thrust demands for DGPS with/without INS.
Figure 7:
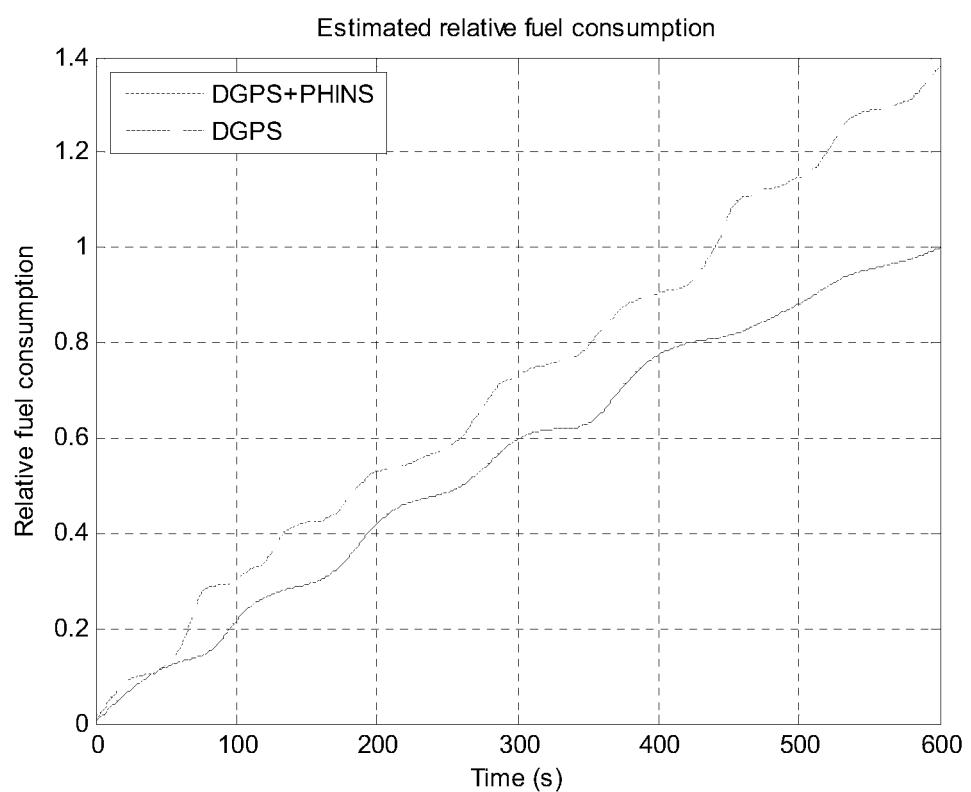
FIG. 7 is a graph showing estimated relative fuel consumption for DGPS with/without INS.
Figure 8:
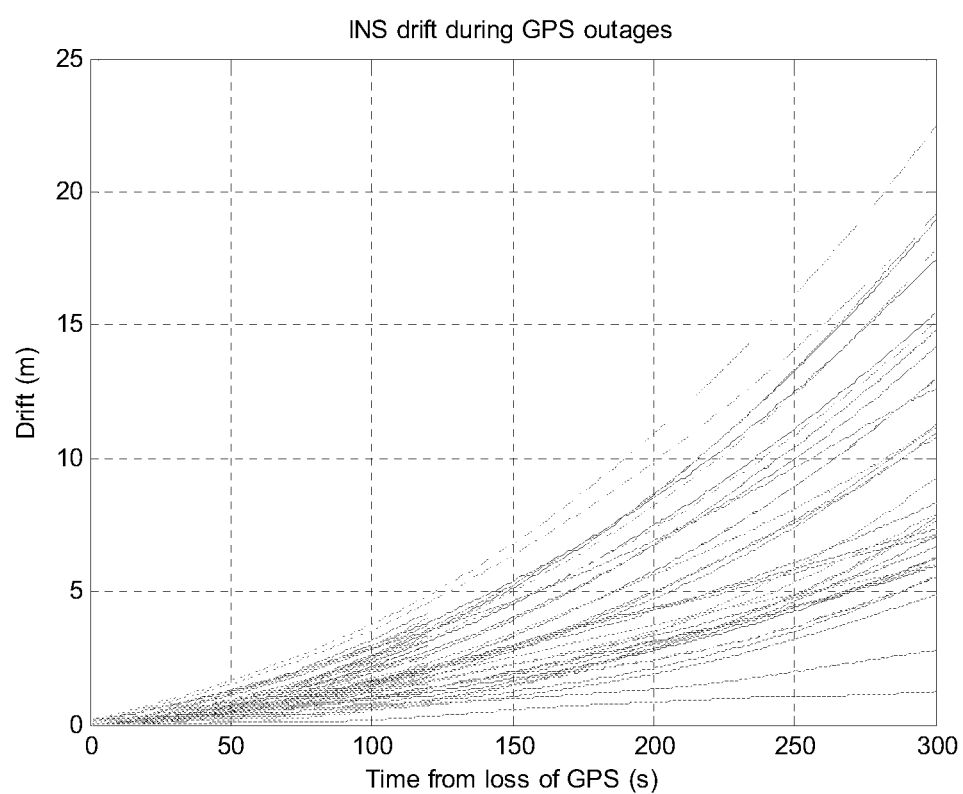
FIG. 8 is a graph showing the evolution of INS drift during outages of 120 s and 300 s.
Figure 9:
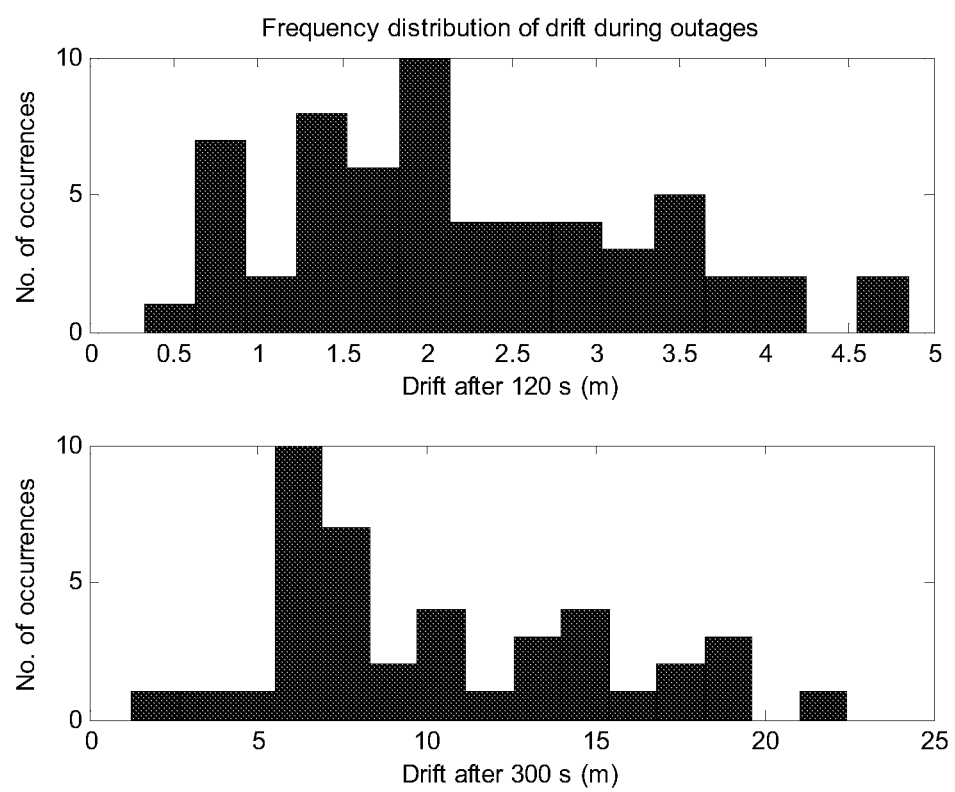
FIG. 9 is graph showing the frequency distribution of INS draft after outages of 120 s and 300 s.

An improved architecture for a DP system 1 will now be explained with reference to FIGS. 12 and 13.

A DP system 1 includes a Kalman filter 2 to combine data to estimate a vessel's position and heading and dynamically control them. The output of the Kalman filter 2 is supplied to a vessel control unit 4 that outputs a signal to the thrusters (not shown) to cause them to bring the position of the vessel closer to a desired reference position.

The data is supplied by a plurality of position measurement equipment (PME) units (not shown) located on the vessel. Two PME units are of the same type (e.g. satellite navigation systems using GPS or DGPS) and the data they supply are labelled PME1 (type 1) and PME2 (type 1). Another two PME units are also of the same type (e.g. hydro-acoustic positioning systems) and the data that they supply are labelled PME3 (type 2) and PME4 (type 2).

An inertial navigation system (INS) unit 6 is integrated with the DP system. The INS unit 6 can provide information about vessel position but due to natural drift it requires periodic updates from a PME unit. The architecture may allow for the INS unit 6 to be replaced by a basic inertial measurement unit (IMU) which outputs raw acceleration measurements to the Kalman filter 2 rather than position measurements. It will be readily appreciated that the Kalman filter 2 may be suitably adapted to accept such acceleration measurements.

The data supplied by each of the PME units is provided to a switch array controller 8 and to switch array 10. Each individual switch in the array can be operated under the control of the switch array controller 8 to provide the data from each of the PME units to either the Kalman filter 2 or the INS unit 6. The result of this is that any data that is supplied to the INS 6 for the purpose of correcting drift is excluded from the vessel position estimation that is carried out by the Kalman filter 2.

However, in certain cases the switches of the switch array 10 can be configured to provide a third option, which is to prevent data supplied by associated PME unit from being provided to either the Kalman filter 2 or the INS unit 6.

The data supplied by the INS unit 6 is provided to the Kalman filter 2 and used in the vessel position estimation.

In general terms, the data supplied by the PME units and the INS unit 6 will normally represent position measurements, but it may also represent acceleration measurements or velocity measurements, for example. Additional information such as status indicators, data quality indicators and statistical information may also be included in the data that is supplied by the PME units and the INS unit 6. The additional information can be used by the Kalman filter 2, the switch array controller 8 and the INS unit 6. For example, the Kalman filter 2 may use the additional information together with any position, acceleration or velocity measurements, when deriving a vessel position estimate. The switch array controller 8 may use the additional information to control the operation of the switch array 10.

Figure 12:
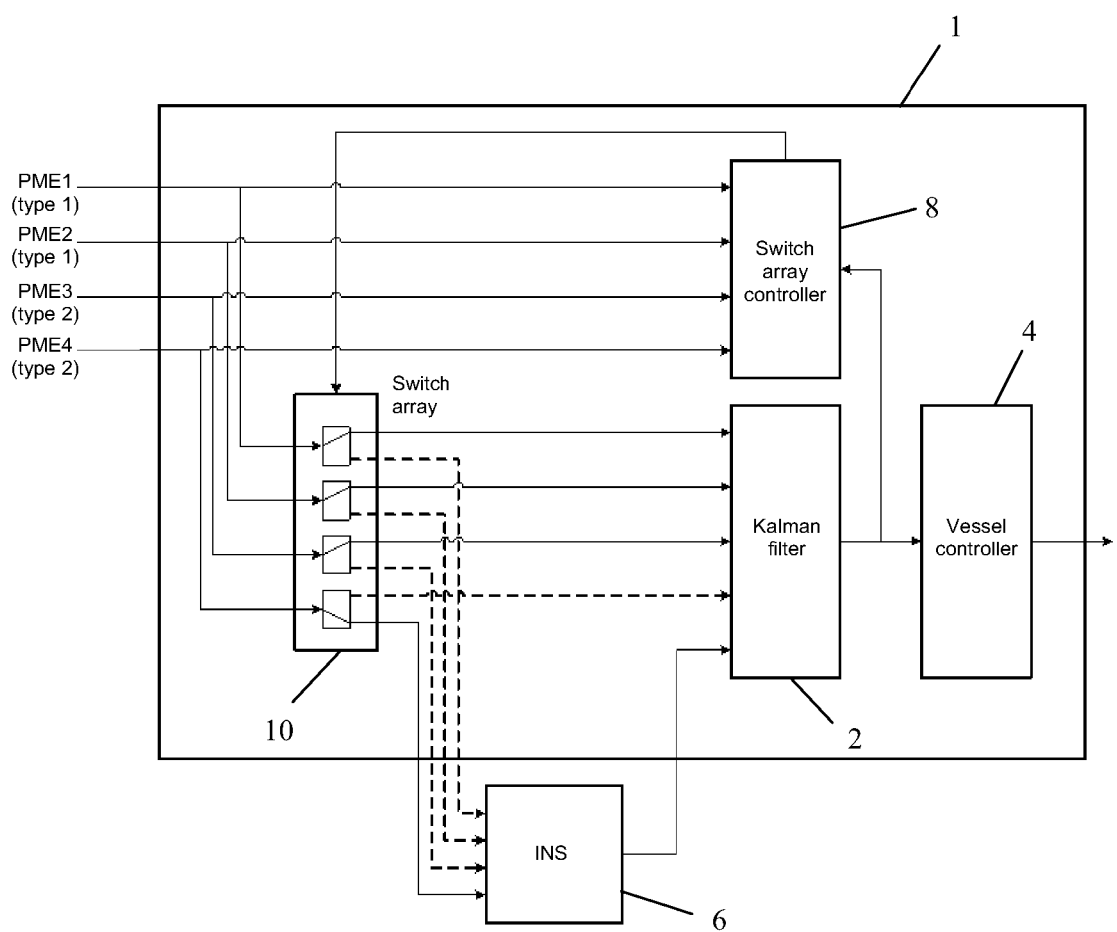
FIG. 12 is a block diagram of an improved architecture for a DP system according to the present invention.

FIG. 12 shows the situation where the data labelled PME4 (type 2) is supplied to the INS unit 6 to correct drift, represented by the solid line extended between the bottom switch of the switch array 10 and the INS unit. The data labelled PME1 (type 1), PME2 (type 1) and PME3 (type 2) is supplied to the Kalman filter 2, represented by the solid lines extending between the three upper switches of the switch array 10 and the Kalman filter.

The fact that the data labelled PME4 (type 2) is not being supplied to the Kalman filter 2 is represented by the dashed lines extending between the bottom switch of the switch array 10 and the Kalman filter. Similarly, the fact that the data labelled PME1 (type 1), PME2 (type 1) and PME3 (type 2) is not being supplied to the INS unit 6 is represented by the dashed lines extending between the three upper switches of the switch array 10 and the INS unit 6.

Figure 10:
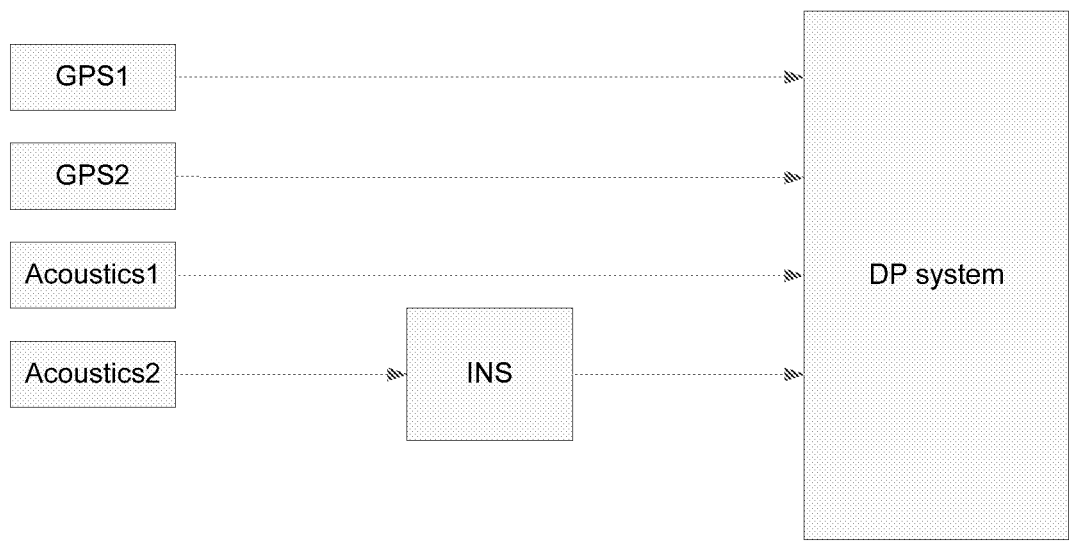
FIG. 10 is a block diagram of a first known architecture for a DP system using INS.
Figure 11:
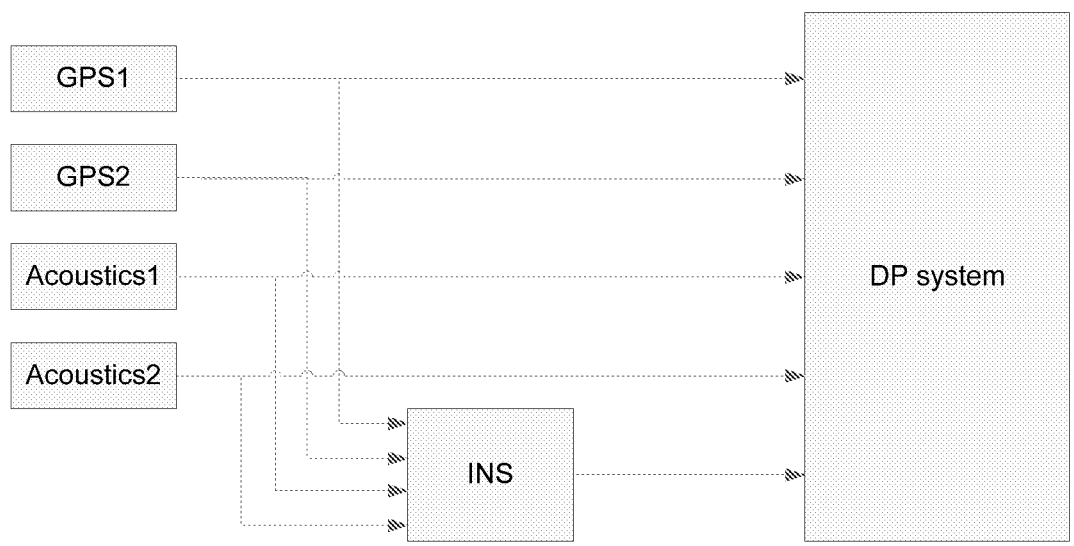
FIG. 11 is a block diagram of a second known architecture for a DP system using INS.

The main difference between the architecture of FIG. 12 and the known architectures of FIGS. 10 and 11 is the ability to dynamically optimise the operation of the DP system 1 by combining, in real time, one or more of the PME units with the INS unit 6. For example, the switch array controller 8 can use the data supplied by the PME units to automatically choose between PME units of one particular type, perhaps by selecting the PME unit of that type with the best or worst data quality depending on the desired operating requirements of the DP system 1. The switch array controller 8 can also choose between PME units of different types.

The selection logic employed by the switch array controller 8 can use an output of the Kalman filter 2 as well as the data supplied by the PME units. For example, the vessel position estimates provided by the Kalman filter 2 might be useful in determining fault conditions on the PME units. The selection logic may also use statistical information supplied by the Kalman filter 2 on the vessel or the data supplied by the PME units.

In certain situations, the switch array 10 may be controlled directly by an operator to combine one or more PME units with the INS unit 6. In other words, the automatic optimisation of the DP system 1 and the dynamic switching of the switch array 10 under the automatic control of the switch array controller 8 may be overridden.

If data from more than one PME unit is supplied to the INS unit 6 via the switch array 8 then the data can be combined using a Kalman filter (not shown) or other suitable algorithm before being used by the INS unit to correct for drift.

Figure 13:
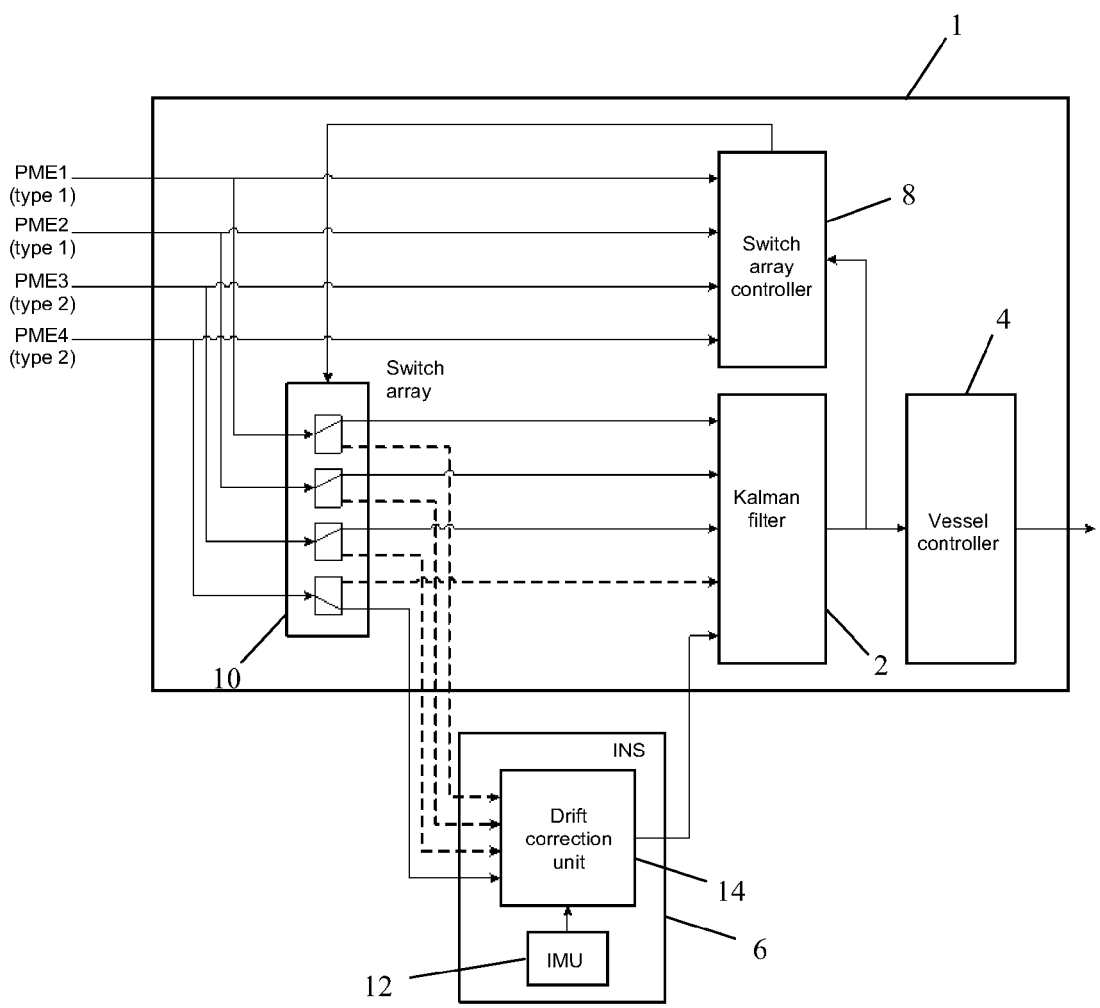
FIG. 13 is a block diagram of an improved architecture for a DP system according to the present invention showing an inertial measurement unit (IMU).

FIG. 13 shows the INS unit 6 in more detail. More specifically, it can be seen that the INS unit 6 includes an IMU 12 and a drift correction unit 14. The data supplied by one or more of the PME units via the switch array 10 is provided to the drift connection unit 14. The drift correction unit 14 also receives acceleration data from the IMU 12 and supplies corrected data to the Kalman filter 2 which is then used in the vessel position estimation that is carried out by the Kalman filter.

Although the drift correction unit 14 is shown to be incorporated in the INS unit 6, it will be readily appreciated that it could also be incorporated in the DP system 1.

The improved architecture of FIGS. 12 and 13 offers a number of additional benefits:
  (i) the DP system can automatically prevent rogue position measurements being passed to the INS unit by comparing multiple PME position measurements,
  (ii) added robustness,
  (iii) improved position accuracy,
  (iv) reduced fuel consumption,
  (v) reduced wear of actuators (e.g. thrusters, rudders and other force applicators such as jets),
  (vi) less noise in the water in the case where hydro-acoustic positioning systems are being used.

The improved architecture can be implemented using a PHINS inertial sensor as a stand-alone INS unit 6.

What is claimed is:

1. Architecture comprising:
   a first position measuring equipment and a second position measuring equipment supplying data;
   an inertial navigation system supplying data;
   a dynamic positioning system for a vessel, configured to derive an estimate of the position or speed of the vessel;
   a switch array configured to:
   selectively supply data in real time from the second position measuring equipment only to the inertial navigation system for correcting drift in the data supplied by the inertial navigation system, and
   selectively supply data from the first position measuring equipment only to the dynamic positioning system for deriving the estimate of the position or speed of the vessel, along with the data supplied by the inertial navigation system.

2. The architecture according to claim 1, wherein the switch array controller uses data supplied by the plurality of position measuring equipment to automatically operate the switch array.

3. The architecture according to claim 2, wherein the switch array controller also uses the estimate of the position or speed of the vessel derived by the means for deriving an estimate of the position or speed of the vessel and/or data supplied by the inertial navigation system to automatically operate the switch array.

4. The architecture according to claim 1, wherein the switch array controller operates the switch array in accordance with an operator command.

5. The architecture according to claim 1, wherein the switch array and switch array controller are incorporated as part of the dynamic positioning system.

6. The architecture according to claim 1, wherein the switch array and switch array controller are incorporated as part of the inertial navigation system.

7. The architecture according to claim 1, wherein the switch array and switch array controller are part of a stand-alone switch unit.

8. The architecture according to claim 1, wherein the inertial navigation system is incorporated as part of the dynamic positioning system.

9. The architecture according to claim 1, wherein the means for deriving an estimate of the position or speed of the vessel is a Kalman filter.

* * * * *